United States Patent [19]

Thompson

[11] Patent Number: 4,656,353
[45] Date of Patent: Apr. 7, 1987

[54] VARIABLE PULSE RATE LED ELECTRONICS FOR A FIBER OPTIC VORTEX SHEDDING FLOWMETER

[75] Inventor: William L. Thompson, Montville, Ohio

[73] Assignee: The Babcock & Wilcox Company, New Orleans, La.

[21] Appl. No.: 820,769

[22] Filed: Jan. 21, 1986

[51] Int. Cl.[4] .......................... G01F 1/32; G01D 5/34
[52] U.S. Cl. .............................. 250/231 R; 73/861.24; 250/227; 250/231 P
[58] Field of Search ............... 250/231 R, 231 P, 227, 250/214 R, 214 AG, 214 C; 73/861.22, 86.24; 350/96.29

[56] References Cited

U.S. PATENT DOCUMENTS

| 4,011,754 | 3/1977 | Pitt | 250/227 |
| 4,270,391 | 6/1981 | Herzl | 73/861.22 |
| 4,519,259 | 5/1985 | Pitt et al. | 73/861.22 |
| 4,562,745 | 1/1986 | Parra | 73/861.22 |

Primary Examiner—Edward P. Westin
Assistant Examiner—Charles Wieland
Attorney, Agent, or Firm—Vytas R. Matas; Robert J. Edwards

[57] ABSTRACT

A fiber optic readout from an optic fiber which receives light from a driven LED and conveys it to a light detector, is processed by a preamp and sample and hold arrangement to produce an output of 4–20 mA. This output is applied to a conventional two-wire 4–20 mA line. Power is conserved by using a preamp in a variable pulse rate mode of operation.

6 Claims, 6 Drawing Figures

VARIABLE PULSE RATE LED ELECTRONICS FOR A FIBER OPTIC VORTEX SHEDDING FLOWMETER

FIELD AND BACKGROUND OF THE INVENTION

The present invention relates in general to sensors, such as vortex shedding flowmeters, which utilize fiber optic readouts, and in particular to a new and useful method and apparatus of utilizing the fiber optic readout for operations in a two-wire, 4 to 20 mA format.

A microbend fiber optic sensor unit can be used in a vortex shedding flowmeter. In such flowmeters, an optical cable is held between microbend jaws. One of the jaws is connected to a sensor beam which is exposed to a flow of fluid that has fluid vortices generated therein. The frequency of the fluid vortex generation (called shedding) is a measure of the flow rate for the fluid. Each time a vortex is shed, the sensor beam is moved. This movement is transferred to the microbend jaws which then bend the optical cable or fiber. In this way light which is passing through the optical cable is modulated thus giving a signal corresponding to the passage of the vortex.

Vortex shedding flowmeters using a light barrier which comprises a light source and a spaced apart light detector, is known for example from U.S. Pat. No. 4,519,259 to Pitt et al. U.S. Pat. No. 4,270,391 to Herzl discloses an electronic arrangement for processing signals from a vortex shedding flowmeter.

For any sensor, voltage and/or current signals from the sensor must either be compatible with circuitry for interpreting the signal, or be converted into signals which are compatible.

One industrially accepted transmission path for conveying signals from a sensor or transducer to interpreting circuitry is a two-wire analog transmission system.

Two-wire analog transmission systems are well known. Such systems include a transmitter which is connected to a power supply by two wires which form a current loop. The transmitter includes, as at least one of its features, a transducer or sensor which senses a process variable such as flow rate, pressure or temperature.

The power supply is connected to the two wires to close the current loop. It is also conventional to provide a resistor in the current loop. The transmitter amplifies the signal from its transducer and this amplified signal is used to draw a certain current from the power supply which is proportional or otherwise related to the process variable. It is conventional to draw from a minimum of 4 mA to a maximum of 20 mA. The current between 4 and 20 mA passes through the resistor to produce a voltage drop across the resistor. This voltage drop can be measured to give a value for the process variable.

The electronics for a two-wire, 4–20 mA industrial control transmitter, however, has only about 3.5 mA and 10 volts with which to operate. Fiber optic systems presently require several mA for the light emitter, often 200 mA or greater and as such are not compatible with two-wire, 4–20 mA transmitters.

Although the current drawn by the transmitter goes up above the 4 mA minimum as the process variable being measured changes, present transmitters only use the 4 mA to operate their circuitry and sensor. An additional 16 mA is available at the upper end of the signal range if the circuitry is capable of utilizing it.

SUMMARY OF THE INVENTION

Pulse mode, or low-duty-cycle operation is necessary to utilize a fiber optic sensor in a 4–20 mA transmitter. The present invention gives a method to achieve such low-duty-cycle operation and the associated techniques to make it suitable for use in a two-wire, 4–20 mA vortex shedding flowmeter transmitter.

The maximum pulse frequency, for a given pulse width, is limited by the power available. Reducing the pulse width decreases the power needed, but speed of available circuits, with the capability of low-power operation, limits the minimum pulse width. The bandwidth for the transmitter is limited as signal frequencies are restricted to less than half of the pulse (or sample) frequency to prevent aliasing or frequency foldover about the sampling frequency.

The system may be operated with a fixed pulse rate and circuit current which is limited to 4 mA, or it may operate in a variable pulse rate mode with the circuit current using the majority of the total current. The invention utilizes the variable pulse rate mode of operation. The signal driving the output stage that controls the 4–20 mA current is used to vary the rate of the pulses in a predetermined manner so that the maximum amount of the total current is available to the optic sensing system.

A sensor, typically but not exclusively a microbend fiber optic unit, providing variable light attenuation controlled by the process variable being measured, may be used. A microbend sensor modulates the received light by only a small amount (on the order of 2% maximum) in a vortex shedding flowmeter application. The electronics must make this small change into a full-scale output. This is accomplished by bucking the signal from the light detector and amplifying it. The bucking is controlled by a feedback circuit so that the average height of the peaks of the pulsed light signal are controlled to a fixed level. This control has a long time-constant so that rapid changes in the signal, the vortex shedding frequencies, are passed. These frequencies are demodulated from the pulse signals by sample and hold circuits and used to control the 4–20 mA output.

Power is gated to the preamp circuit in order to save power. A preamp of the invention uses a programmable current opamp. High current operation is necessary to amplify the fast pulses from the fiber optics. However the low current mode is adequate during the off period of the sampling. Gating the current to the preamp in conjunction with the optic system pulse results in a significant power savings.

Accordingly an object of the invention is to provide a method and circuit for generating and processing signals of an optic fiber which produces output signals compatible with a two-wire 4–20 mA arrangement.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
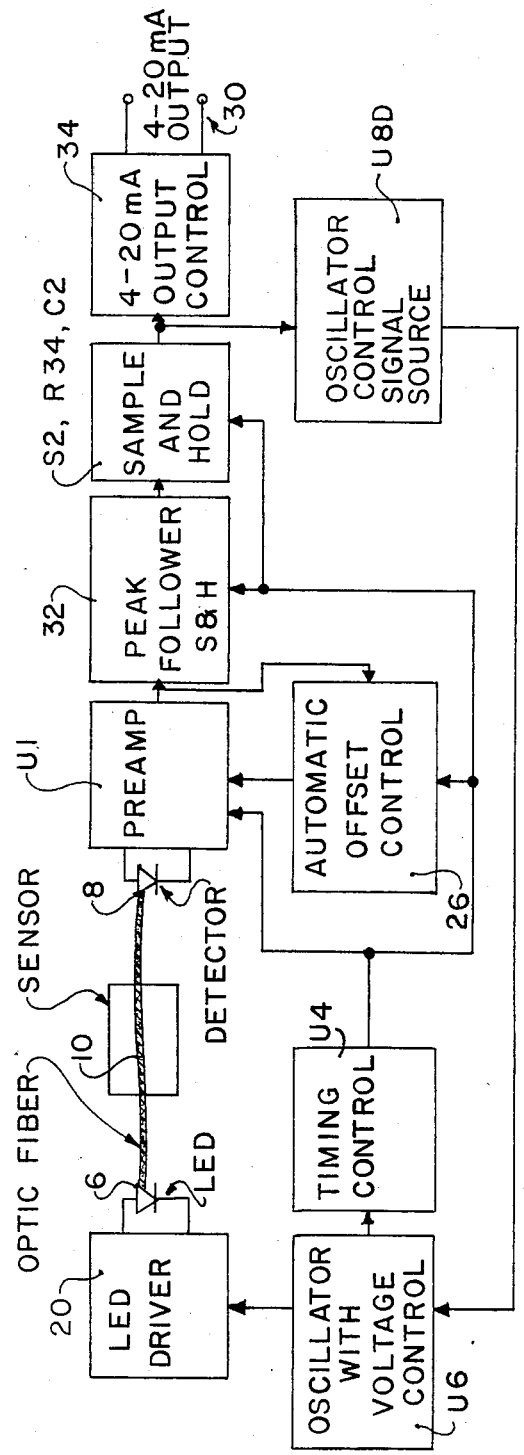
FIG. 1 is a block diagram showing an arrangement in accordance with the invention.

Referring to the drawings in particular, the invention embodied in FIG. 1 comprises an arrangement for processing signals from an optic fiber 10 which are compatible with a two-wire 4–20 mA transmission line 30. The arrangement includes an LED driver 20 which is connected to the LED 6. LED 6 is connected to one end of the optic fiber 10 and emits light pulses into the optic fiber. A light detector 8, such as a light sensitive diode, is connected to the opposite end of optic fiber 10. The signal from detector 8 is processed by a preamp U1. An oscillator with voltage control U6 is connected to the LED driver 10 for supplying driving pulses for the LED 6. Oscillator 6 also drives a timing control U4 which supplies control signals to the preamp U1, an automatic offset control 26, a peak follower sample and hold circuit 32 which is made up of CR1, C1, and U3 and a sample and hold circuit S2, R34, C2.

A control input for oscillator U6 is provided by oscillator control signal source U8D. Signals from the sample and hold circuit are supplied to a 4–20 mA output control 34 (including U8A and U8R in FIG. 2) which supplies a current signal to the line 30.

Figure 2:
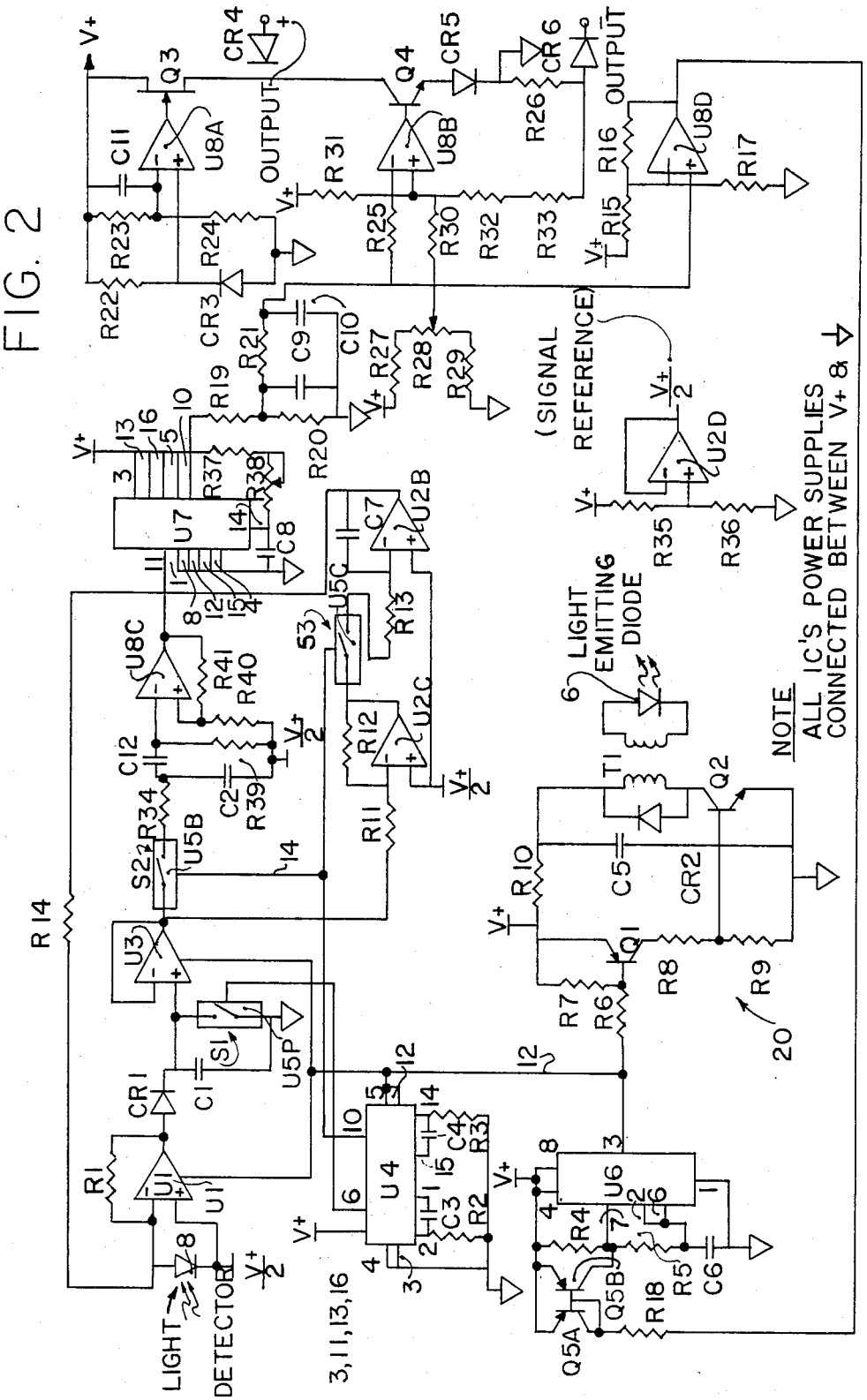
FIG. 2 is a schematic diagram showing a circuit for realizing the arrangement of FIG. 1.

FIG. 2 is a schematic of the electronics suitable for a readout of a fiber optic microbend sensor as used in a vortex shedding flowmeter.

Current to the LED 6 (Light-Emitting-Diode) is supplied as a series of pulses, typically having a duty cycle of 1 to 2%, an amplitude of 200 mA and a repetition rate or frequency of 500 to 5000 Hz in the fixed frequency mode of operation. In the variable pulse rate mode, the duty cycle changes as the pulse width is fixed and the frequency is changed.

Oscillator U6, typically a low-power CMOS version of a 555 timer such as a 7555, is used to generate the control signal for the LED current. A dual transistor, with halves Q5A and Q5B, form a current mirror and supply a current to the timer integrated circuit to increase the rate at which capacitor C6, charges. This decreases the time to charge and increases the frequency of the pulses generated by the circuit. The input to the current mirror is determined by integrated circuit amplifier U8D. The input to U8D is the voltage on capacitor, C10, which is used to drive the 4–20 mA output stage (U8B and Q4). The difference between this voltage and a reference determined by R15 and R17 and V+ is amplified and biased so that the current mirror is cut off when the transmitter's output is 4 mA. The circuit supplies a voltage to R18 and the current mirror of Q5A and Q5B that will cause the frequency of oscillator U6 to go to a maximum when the transmitter's output is 20 mA.

Figure 3:
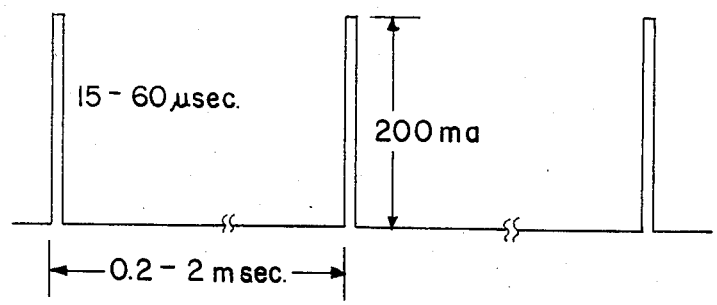
FIG. 3 is a graph showing a current wave form for an LED used as a light transmitter to the optic fiber.

Transistors Q1 and Q2 amplify the oscillator's output. Transformer T1 serves to match the drive requirements of 1.5 volts of the LED 6 to the circuit's higher drive voltage of typically 6 to 10 volts. This transformer is typically a pulse transformer with a 4:1 turns ratio. Resistor R10 and capacitor C5 serve to keep the high pulses of current to the optic system from creating voltage pulses on the power supply for the rest of the transmitter circuit. C5 supplies the high peak currents for the LED pulses and stores charge between the LED pulses. Thus the LED current primarily comes from the charge stored in capacitor C5. FIG. 3 shows the current waveform to the LED 6.

The light pulses are transmitted to the light detector 8 by a fiber optic cable 10 shown in FIG. 1. Varying attenuation is effected typically by application of bending to the fiber 10 or the changing of coupling at a discontinuity in the fiber. The light detector 8 converts the received light into an electrical signal, typically a current. In the circuit of FIG. 2, the detector supplies a current to the following circuit:

A preamp U1 converts the detector current pulses into voltage pulses. The integrated circuit used as preamp U1 must be capable of low power operation and have sufficient bandwidth and speed to faithfully amplify the pulses. A type TLC251 from Texas Instruments is a programmable CMOS opamp which meets these requirements. In the low-current mode it meets the power requirements. In the high-current mode it has the bandwidth necessary for amplifying the pulses. The amplifier is switched into the high power and high bandwidth mode only when the LED pulse is present (controlled by the drive signal over line 12). Thus, it is not drawing the high power during periods when high power is not necessary for the circuit's operation.

Figure 4:
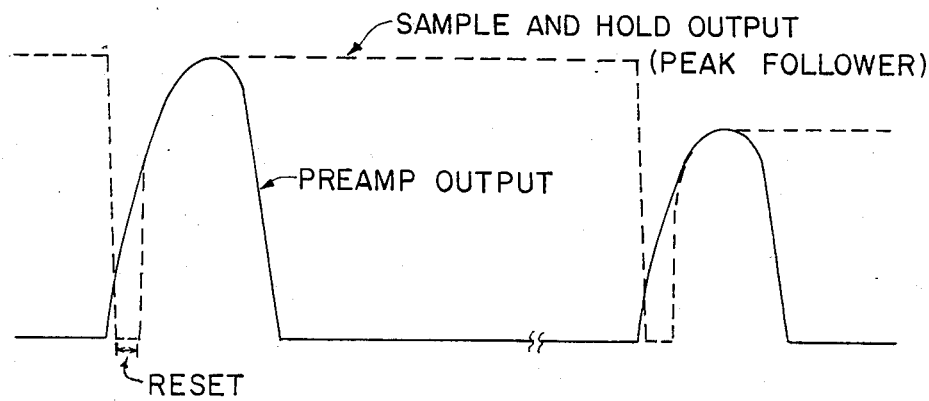
FIG. 4 is a graph showing a peak following sample and hold action used in the invention.

A peak-following sample and hold function is performed by the combination of C1, CR1 and S1 (part of U5). Switch S1 discharges the voltage on capacitor C1 at the beginning of the light pulse. S1 is controlled by a one-shot multivibrator circuit in U4 (MC14538 or MC14528) which is triggered by the beginning of the pulse to the LED on line 12. Then C1 charges through diode CR1 from the output of the preamp U1. C1 stops charging at the peak of the preamp output and the diode prevents the immediate discharge necessary to follow the downside of the pulse. FIG. 4 shows this operation. Opamp U3 buffers the voltage on C1, allowing the following circuitry to operate without affecting the signal on C1. U3 has the same bandwidth and speed requirements as U1 and as such uses a TLC251 opamp with its power and operation switched in the same manner as U1.

Figure 5:
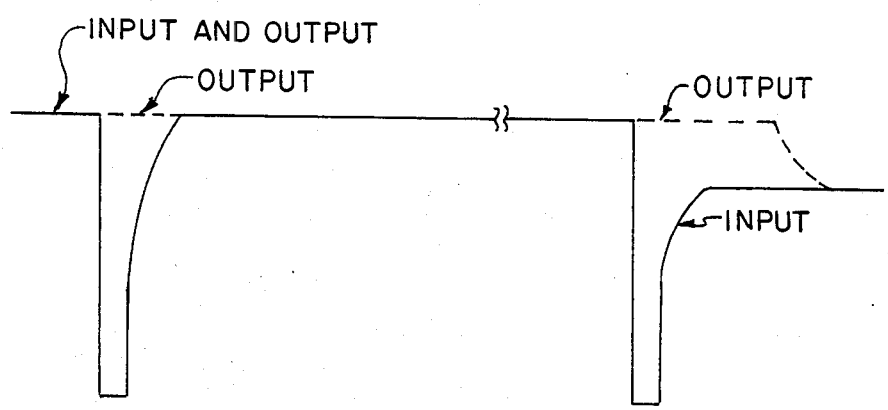
FIG. 5 is a graph showing the action of a second sample and hold circuit of the invention.

A second sample and hold is performed by switch S2, resistor R34 and capacitor C2. Switch S2 is closed after the LED pulse has finished as controlled by line 14 from timing control U4. The peak of the pulse as stored on capacitor C1, is sampled and stored on capacitor C2. The resistor R34 and capacitor C2 perform a low-pass filtering action to reduce the sampling frequency (LED pulse frequency) component from the signal received from the optical system. FIG. 5 shows the output of this circuit.

Figure 6:
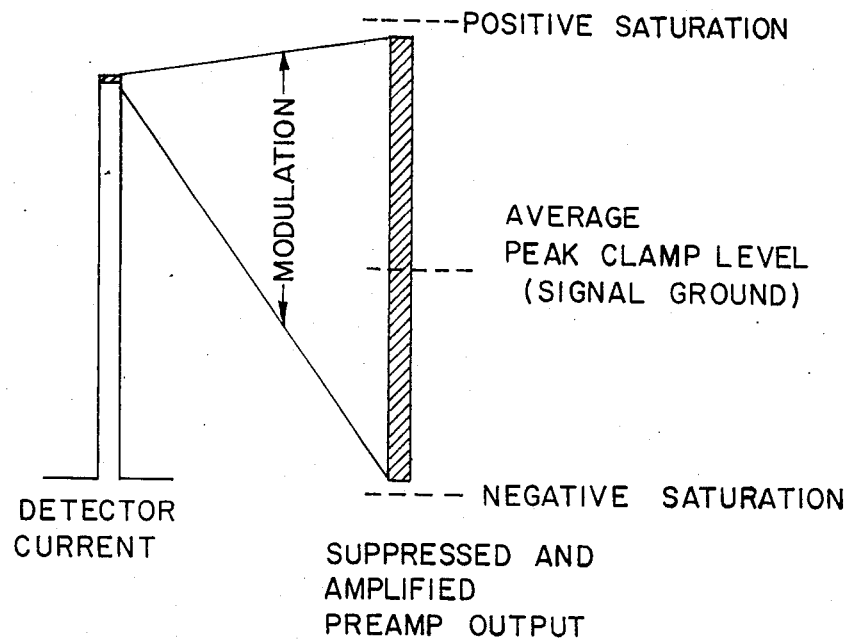
FIG. 6 is a graph showing pulse modulation for a preamp in the circuit which receives signals from the light detector connected to the optic fiber.

Opamps U2B and U2C form a feedback control loop. This loop compares the peaks of the pulses with signal ground and returns a current to the preamp input to drive the peaks back to ground. This is necessary since the pulses are quite large and are sufficient to drive the preamp into saturation. FIG. 6 shows the signal and the typically 2% maximum modulation. The effect of this circuit on the signal is also shown. U2B is an integrator (or low pass filter) so that the adjustment effect is slow-acting. Thus long term variations are removed and signal components are not affected. Switch S3 controls the operation of this loop so that it only operates immediately following the end of the pulse to the LED. This removes any influence from decay on capacitor C1's voltage between signal pulses.

Internal power supply is regulated by U8A and its associated components including Q3, a series pass field effect transistor (FET). Opamp U2D divides the internal power supply, typically 10 volts, into two 5-volt supplies with signal ground in the middle. This allows for operation of amplifiers that have voltage swing above and below signal ground.

The typically low level sine wave signal from the second sample and hold is operated on by hysteresis comparator U8C, which converts it to a rectangular or square wave. This rectangular or square wave is used to trigger a one-shot multivibrator U7 to give a fixed length, fixed amplitude pulse for each cycle of the sine wave signal from the optical system. This is then averaged by R19 and c9 and used to control the 4–20 mA output signal by the circuit of opamp U8B, Q4, and their associated resistors.

The present invention thus provides a method of utilizing a fiber optic readout using a microbend or other sensor of similar characteristics, in particular the readout of a vortex shedding flowmeter that operates in a two-wire 4–20 mA format. The invention overcomes the power requirement restrictions in the application of current fiber optic techniques to such a transmitter.

While a specific embodiment of the invention has been shown and described in detail to illustrate the application of the principles of the invention, it will be understood that the invention may be embodied otherwise without departing from such principles.

What is claimed is:

1. A method of processing a sensor signal from a light detector at one end of an optic fiber which signal is modulated between maximum and minimum levels by the optic fiber, the optic fiber receiving light in pulses from a light emitter, comprising:
    preamplifying the sensor signal using a preamp having high and low current modes, the high current mode having a broad bandwidth for amplifying the sensor signal, the amplified sensor signal having positive and negative saturation levels for the preamp which correspond respectively to the maximum and minimum modulated signal levels;
    clamping an average saturation level between the positive and negative saturation levels, as a signal ground and at a long time constant with respect to changes in the modulated sensor signal so that rapid changes in the sensor signal pass;
    generating a variable pulse rate drive signal having a frequency which is dependent on a sampled and held signal, and applying said drive signal to the light emitter to light the light emitter in pulses;
    applying the drive signal to the preamp for switching the preamp into its high current mode only during pulse widths of pulses in the drive signal, the preamp being switched to its low-current mode at other times;
    sampling and holding peaks of the amplified sensor signal from the preamp at a rate controlled by said drive signal to produce a peak-following sample and hold signal;
    low pass filtering the peak-following sample and hold signal at a frequency of the drive signal to reduce a sampling frequency component on the peak-following sample and hold signal which component is attributable to the drive signal, to form said sampled and held signal; and
    applying the sampled and held signal to a current output control which generates a current level that is proportional to the sensor signal from the light detector.

2. A method according to claim 1, including operationally amplifying the peak-following sample and hold signal using an opamp which has low and high current modes and a bandwidth response similar to that of said preamp, and switching the opamp to its high current mode using the drive signal and only during pulses of the drive signal, the opamp being switched to its low current mode at all other times.

3. A method according to claim 2, including microbending the optic fiber for modulating the sensor signal.

4. A method according to claim 3, including microbending the optic fiber sensing generated vortices in fluid which passes a vortex shedding flowmeter.

5. An apparatus for processing a sensor signal from a light detector at one end of an optic fiber which signal is modulated between maximum and minimum levels by the optic fiber, the optic fiber receiving light in pulses from a light emitter, comprising:
    a preamp connected to the light detector for amplifying the sensor signal, the preamp having high and low current modes of operation with a high bandwidth in its high current mode;
    clamping means connected to an output of said preamp for clamping the amplified sensor signal at an average level between positive and negative saturation levels for said preamp, as a signal ground, said clamping means having a long time constant with respect to changes in the modulated sensor signal so that rapid changes in the sensor signal pass;
    drive signal generating means for generating a drive signal having a frequency which is dependent on a sampled and held signal, said drive signal means being connected to the light emitter for lighting the light emitter in pulses;
    peak-following sample and hold means connected to said clamping means for generating a peak-following sample and hold signal which follows peaks of the signal passed by said clamping means;
    low-pass filter means connected to said peak-following sample and hold means for filtering out a frequency component of said drive signal from said peak-following sample and hold signal, said low-pass filter means generating said sampled and held signal for said drive signal means; and
    current control means connected to said low-pass filter means for receiving said sampled and held signal and generating a current signal corresponding to said sensor signal.

6. An apparatus according to claim 5, wherein said peak-following sample and hold means includes an opamp having high and low current modes and a bandwidth characteristic similar to that of said preamp, said preamp and said opamp being controlled by said drive signal from said drive signal means to switch to the high current mode only during pulses of said drive signal.

* * * * *